Sept. 18, 1951 H. WEISS 2,568,102

UTILITY BOARD AND RETAINING FRAME FOR AUTOMOBILES

Filed Sept. 15, 1949

INVENTOR
HOWARD WEISS

BY Irving Seidman
ATTORNEY

Patented Sept. 18, 1951 2,568,102

UNITED STATES PATENT OFFICE 2,568,102

UTILITY BOARD AND RETAINING FRAME FOR AUTOMOBILES

Howard Weiss, Richmond Hill, N. Y.

Application September 15, 1949, Serial No. 115,802

3 Claims. (Cl. 311—21)

This invention relates to what I have termed a "utility board" for general use by the occupant of an automobile. The utility board is slidable mounted in underlying relation to the dashboard of the automobile. The character of the device to which the invention relates is old as thus far indicated. However, the utility board of this invention is improved in many respects over the prior art devices, as will be explained.

But before enumerating these the general uses for the device will be first mentioned. The device is very useful as a desk or shelf upon which the driver may lay out a road map for consultation, and is particularly useful for salesmen who may spread out their catalogs, manuals, etc., on the shelf or table, or may use the same for writing out orders, making reports, etc. Truck drivers and delivery-men may find similar uses for the device.

In addition to its general use for writing purposes or for supporting a book or other reading matter, the device may be used as a table for supporting glasses and dishes for light refreshments, and for supporting other small objects of limited weight.

The principal objects of the invention are to provide a device as described which can be very cheaply fabricated and very readily installed in an automobile, which will be attractive and conveniently used for multiple purposes. Allied objects are to provide such a utility board which will not be scratched or otherwise bruised by the various uses to which it is put, and which will not be marred or discolored by heat or liquid (when used as a refreshment stand, as suggested above; or by ink when used as a writing desk, etc.) and, lastly, will not be broken by the weights of objects placed on it or by force exerted thereon unwittingly by the user. In this connection, it should be mentioned that the improved device is intended to support a portable typewriter in convenient position for typing.

I have found that a board having all three features mentioned—namely, scratch-proof; non-marred by liquids or heat; and strength—may be attained by making it of shatter-proof glass. By providing a shatter-proof glass utility board I have attained the following additional objects:

The utility board of this invention has enhanced beauty of appearance, as will be seen; because of the strength and rigidity of the material used the board may be made wider without the need of extraneous bracing; the board is easily cleaned by merely wiping with a rag; by reason of the transparency of the glass, papers, such as road-maps, time-tables and the like, may be pasted on the underside thereof in permanent position without interfering with the free use of the board; the board is of ideal size, weight, strength etc., so that it may be removed entirely from its holder and used separately, for example, by placing on the lap or resting on the steering wheel.

For the attainment of the foregoing and such other objects as may appear or be pointed out I have shown a preferred embodiment of my invention in the accompanying drawings, wherein.

Figure 1:
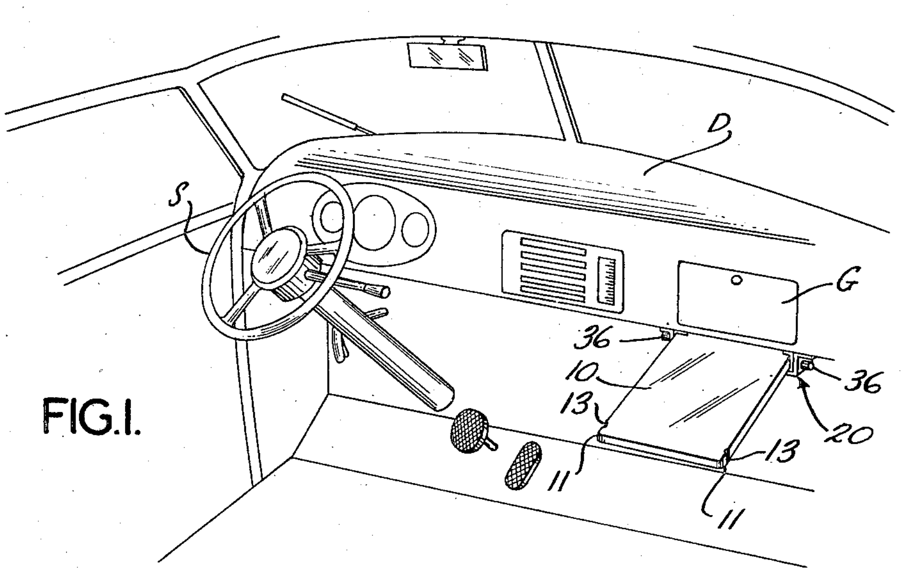
Fig. 1 is a perspective view of the interior of an automobile showing the dashboard and the improved utility board, pulled slightly forward.

The improved device, which comprises the utility board 10 and its holder (generally designated 20), is disposed in underlying relation to the dashboard D and opposite the seat beside the driver (to the right of the steering wheel S); as shown in Fig. 1, it underlies glove compartment C. As already mentioned in the statement of invention, utility board 10 is made of shatter-proof glass; the beneficial direct and indirect results of employing a shatter-proof glass board have been outlined in the statement of invention, other results and advantages will be pointed out herein. For one thing, the two front corners are rounded off, as indicated at 11, 11; this not only removes the danger of sharp points at the corners, but also improves the appearance of the board; additionally, the user can thereby tell at once which end of the board should be first inserted in its holder 20, after the board has been removed therefrom for separate use (as suggested in the statement of invention).

Figures 2, 3, 4, 5, 6:
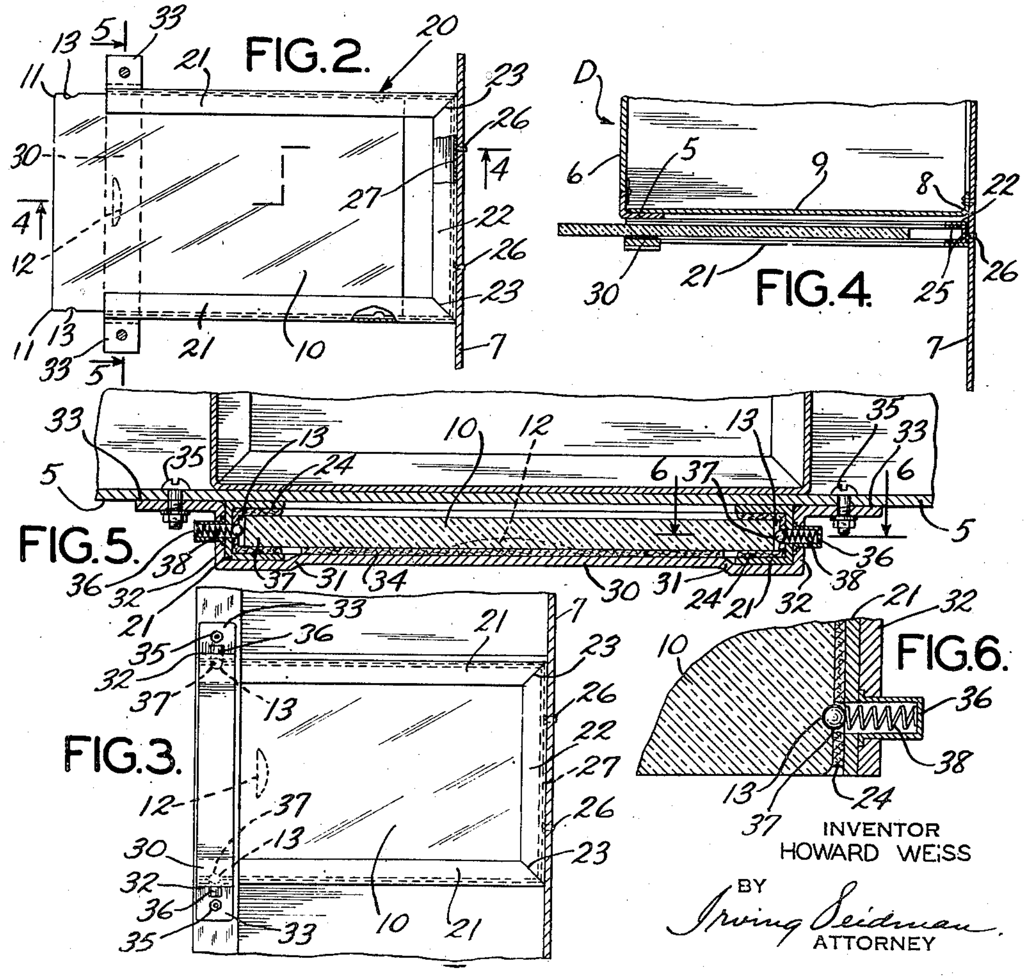
Fig. 2 is a top view of the device, with the board itself pulled slightly forward.
Fig. 3 is a view similar to Fig. 2 but showing the board lodged in retracted position.
Fig. 4 is a longitudinal section taken on the line 4—4 of Fig. 2.
Fig. 5 is a transverse section, on enlarged scale, taken on the line 5—5 of Fig. 2.
Fig. 6 is a fragmentary section taken on the line 6—6 of Fig. 5.

The holder, generally designated 20 is fabricated by channel strips, formed in the U-shape shown in Figs. 2–3 and presenting the two side channels 21, 21 and the rear channel 22. Conveniently the channel frame 21—22—21 is formed from a single length of channel strip by incising the miter cuts 23 and bending. The inside thru surfaces of the channel is lined with felt, as indicated by 24 with respect to the two side channels 21, 21 in Fig. 5, and indicated by 25 with respect to the rear channel 22 in Fig. 4. The glass board 10 fits snugly within the felt-lined channel holder and is held thereby against rattling. The board is additionally supported by a cross-brace 30 which is also used in attaching the device to the underside of the dashboard, as will now be described.

The channel frame 21—22 is secured, as already mentioned in underlying relation to dashboard D, Fig. 1, more particularly, in underlying relation to the horizontal floor panel 9 of the dashboard, Fig. 4. As shown in this figure, floor panel 9 is upturned at its rear to form a flange 8 which is secured to the rear panel 7 of the automobile. The front edge of floor panel 9 is supported on, and secured to, an inwardly-turned flange 5 at the lower end of front panel 6 of the dashboard.

The forward ends of the side channels 21, 21 of the channel frame is secured to the underside of the aforesaid front panel flange 5 by means of the cross-brace 30. Cross-brace 30 is formed of a metal strip of the width best shown in the plan view of Fig. 2, and is in underlying relation to the channels 21, 21, as best seen in Fig. 5. As clearly seen in this figure, cross-bar 30 is slightly offset at 31, 31 so that it closely hugs the underside of the utility board (10) and the lower flanges of the side channels 21, 21. It is bent upwardly at the said side channels to form two vertical flanges 32, 32 which hug the webs of side channels 21, 21. Cross-brace 30 is again turned outwardly to form the two horizontal flanges 33, 33. The portion of the cross-brace 30 in underlying abutment with utility board 10 is lined with fur as indicated at 34.

The horizontal flanges 33, 33 of the cross-brace 30 are secured to the front flange 5 of the dashboard panel, as by the bolts 35, 35. It is thus seen that cross-brace 30 not only secures the front ends of the side channels 21, 21 of the channel frame to the underside of the dashboard, but also supports the front end of the utility board 10.

The rear channel 22 of the channel frame is secured to the rear panel 7 of the automobile by means of screws or thread-forming fasteners 26, 26 (two shown in Fig. 2) which pass through holes in the web 27 of rear channel 22 and enter holes in the rear panel 27.

In the retracted position of utility board 10, its front edge is flush with the surface of the dashboard. Means must therefore be provided whereby the board may be grasped for extending forwardly of its channel holder 20. I have avoided the use of a forwardly protruding knob or the like, which would not only be unsightly but also dangerous, by providing a finger recess 12, in the underside of utility board 10. Additionally, the provision of such an undercut finger recess in no way impairs the impressive beauty of the improved glass board, the front edge of which is leveled and its corners artistically rounded, as at 11, 11.

Although glass board fits quite snugly in channels 21, 22 and is frictionally retained by the felt-lining 24, 25 thereof and the felt-lining 34 of cross-brace 30, a spring detent arrangement is provided to prevent the glass board—which is quite heavy—from sliding out of the channel holder when the automobile is hill climbing. For this purpose, the side edges of glass board 10 is provided with a pair of rounded grooves 13, 13 extending the entire thickness of the glass and disposed near the front edge of the board. More precisely, grooves 13, 13 are placed to be, when the board is in retracted position (as it is in Fig. 3) substantially centrally of the cross-brace 30, more particularly, of its upright flanges 32, 32 is provided a hollow detent cup 36 at the end of which is retained a small ball 37 which is urged outwardly by compression coil spring 38 within cup 36. Spring-pressed balls 37, 37, fitting in grooves 13, 13 of board 10, impositively hold the board in retracted position, Fig. 3, but permitting, by means of finger recess 12. Additionally, the spring-pressed balls 37, 37, pressing against the side edges of board 10 when the same is pulled forwardly, impose a frictional resistance on the board to retain it in the forward position to which extended.

I claim:

1. In a device of the class described for use in an automobile having a dashboard comprising a front panel spaced from the rear panel of the car by the floor panel of the dashboard, in combination a utility board fabricated of shatterproof glass and having rounded front corners, a channel frame for said board formed from a channel strip to present parallel sides and a rear channel, the inside surfaces of the channel being felt-lined, fasteners for securing the web of the rear channel to said rear panel of the car, a cross-brace disposed in underlying relation to the front ends of the side channels and turned upwardly at the webs of said channels to form upright flanges and turned outwardly to present horizontal flanges, means for securing said horizontal flanges of the cross-brace to said floor panel of the dashboard, said cross-brace slightly offset at the side channels to present the top surface thereof closer to the glass board, said top surface of the cross-brace being felt-lined, the underside of the glass board being provided with a centrally-disposed finger recess, said glass board having a pair of vertically-oriented grooves in its side edges aligned substantially centrally of said upright flanges of the cross-brace, and a pair of detent cups comprising a ball retained at the open end of the cups and a compression coil spring within the cups urging the balls outwardly into engagement with said grooves of the glass board.

2. In a device of the class described for use in an automobile having a dashboard comprising a front panel spaced from the rear panel of the car by the floor panel of the dashboard, in combination, a utility board fabricated of shatterproof glass, a channel frame for said board formed presenting parallel sides and a rear channel, the inside surfaces of the channel being felt-lined, fasteners for securing the web of the rear channel to said rear panel of the car, a cross-brace disposed in underlying relation to the front ends of the side channels and turned upwardly at the webs of said channels to form upright flanges and turned outwardly to present horizontal flanges, means for securing said horizontal flanges of the cross-brace to said floor panel of the dashboard, the top surface of the cross-brace being felt-lined, the underside of the glass board being provided with a centrally-disposed finger recess, said glass board having a pair of vertically-oriented grooves in its side edges aligned substantially centrally of said upright flanges of the cross-brace, and a pair of detent cups provided at said central points of said flanges, said detent cups comprising a ball retained at the open end of the cups and a compression coil spring within the cups urging the balls outwardly into engagement with said grooves of the glass board.

3. In a device of the class described for use in an automobile having a dashboard comprising a front panel spaced from the rear panel of the car by the floor panel of the dashboard, in combination, a utility board fabricated of shatter-proof glass, a channel frame for said board presenting parallel sides and a rear channel, fasteners for securing the web of the rear channel to said rear panel of the car, a cross-brace disposed in underlying relation to the front ends of the side channels and turned upwardly at the webs of said channels to form upright flanges and turned outwardly to present horizontal flanges, means for securing said horizontal flanges of the cross-brace being slightly offset at the side channels to present the top surface thereof closer to the glass board, the underside of the glass board being provided with a centrally-disposed finger recess, said glass board having a pair of vertically-oriented grooves in its side edges aligned substantially centrally of said upright flanges of the cross-brace, and a pair of detent cups provided at said central points of said flanges, said detent cups comprising a ball retained at the open end of the cups and a compression coil spring within the cups urging the balls outwardly into engagement with said grooves of the glass board.

HOWARD WEISS.

REFERENCES CITED

The following references are of record in the file of this patent:

UNITED STATES PATENTS

| Number | Name | Date |
|---|---|---|
| 2,161,275 | Betts | June 6, 1939 |
| 2,169,503 | Schlegel | Aug. 15, 1939 |
| 2,170,013 | Detwiler | Aug. 22, 1939 |
| 2,182,962 | Constantine et al. | Dec. 12, 1939 |
| 2,205,974 | Kramer | June 25, 1940 |